Feb. 18, 1964   W. HAUSZ ET AL   3,121,868
HIGH RESOLUTION OBJECT LOCATION SYSTEM
Filed Nov. 20, 1953   2 Sheets-Sheet 1
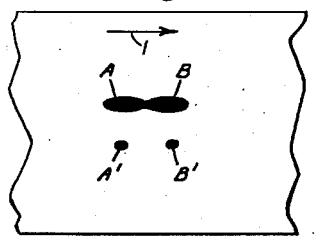
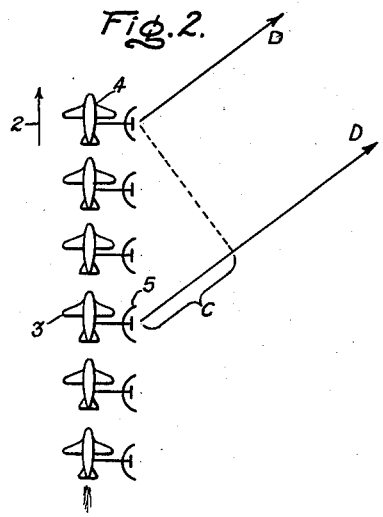
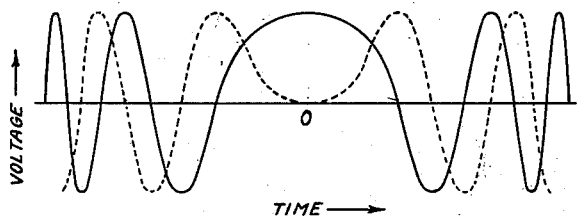
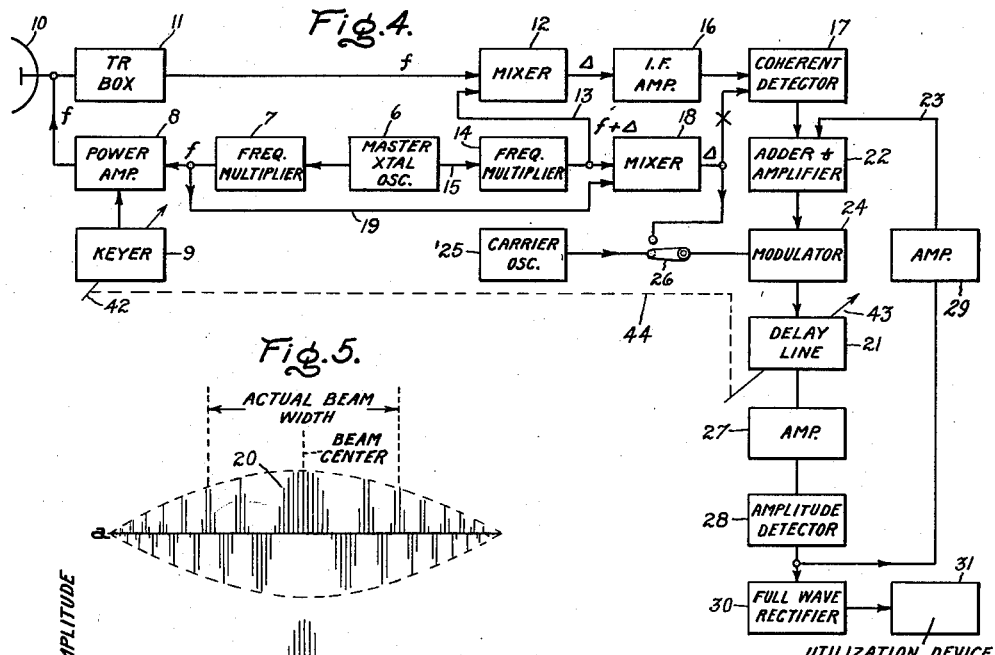
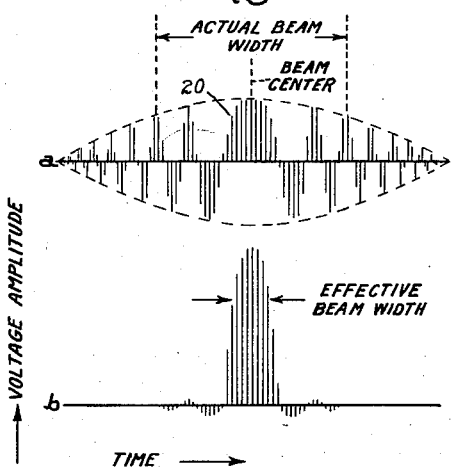
Inventors:
Walter Hausz,
Frank R. Dickey, Jr.
by Charles M. Hutchins
Their Attorney.

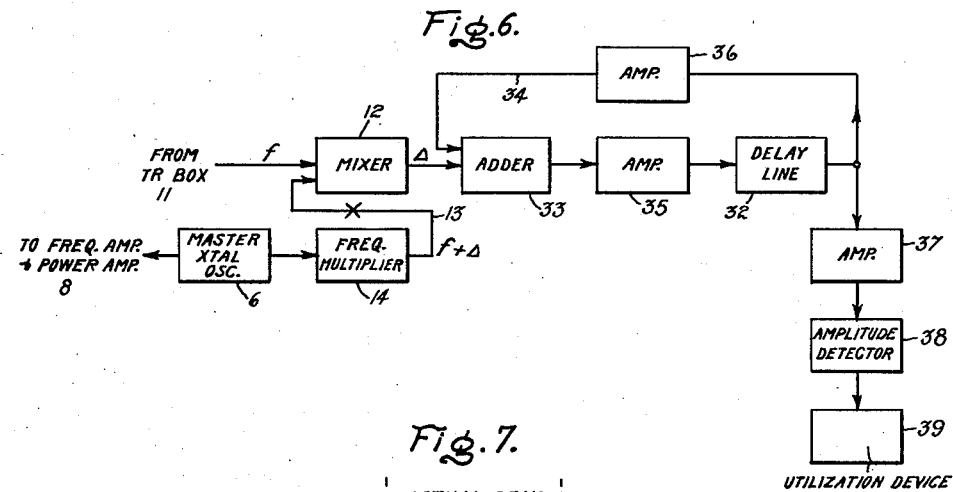
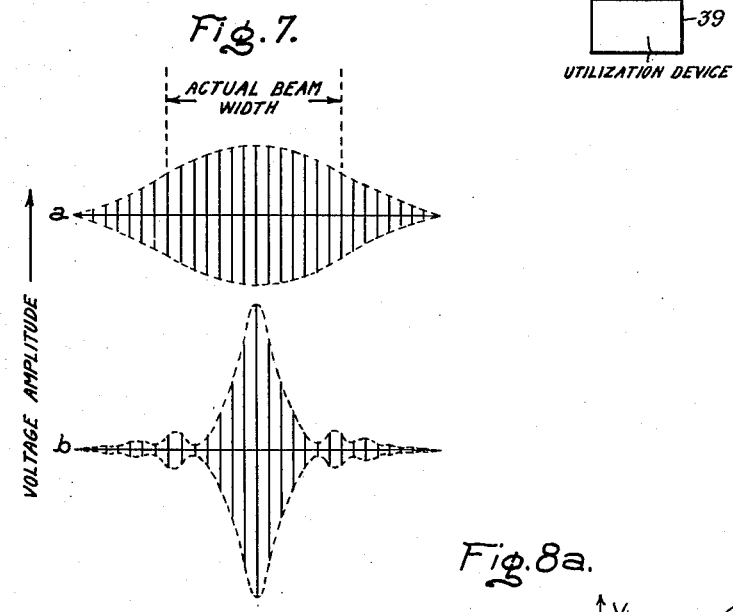
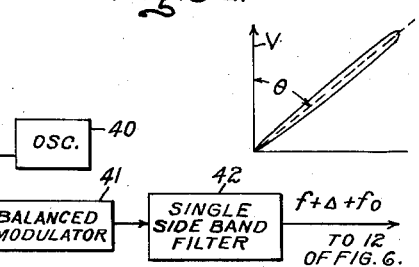
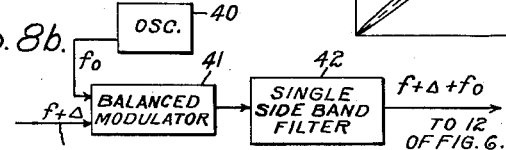
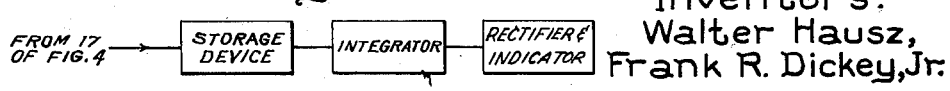

United States Patent Office 3,121,868
Patented Feb. 18, 1964

3,121,868
HIGH RESOLUTION OBJECT LOCATION SYSTEM
Walter Hausz, Dewitt, N.Y., and Frank R. Dickey, Jr., Alexandria, Va., assignors to General Electric Company, a corporation of New York
Filed Nov. 20, 1953, Ser. No. 393,414
24 Claims. (Cl. 343—5)

This invention relates to object location systems and particularly to arrangements for resolving objects detected by radar.

In the field of aircraft transportation, it is well recognized that radar offers considerable promise of increasing all weather operations by enabling detection of useful markers as well as obstacles intercepted during the course of flight. However, in order to distinguish objects of primary interest from objects of lesser interest, as for example terrain features, a need exists for a system permitting of high resolution approaching that of photography.

It is therefore an object of our invention to provide a high resolution radar system.

Another object of our invention is to provide an arrangement for achieving an extremely high resolution in an airborne mapping radar by means of coherent integration.

Another object of our invention is to provide improved angular resolution of detected objects.

Another object of our invention is to effectively extend the range of a radar detection system by a system of coherent integration.

Another object of our invention is to resolve the location of a detected object in an improved manner.

Another object of our invention is to provide an arrangement for effectively decreasing the beam-width of a receiving antenna.

Another object of our invention is to provide an arrangement for effectively increasing the gain of a receiving antenna.

A still further object of our invention is to achieve an improved display of detected objects.

In accordance with the one embodiment of our invention applicable to airborne radar systems, an airborne, directive radar antenna is employed which does not scan, but instead is directed continuously at right angles to the aircraft's direction of flight. By means of a facsimile recorder, or similar device, a map is printed of all that the radar sees as the aircraft flies along. The radar system is made to have a much greater angular resolution and permit of increased ranges of object-detection by making the radar transmission-reception cycle coherent in phase, storing and integrating the echoes received from any given object over a large number of successive pulse transmission and echo reception cycles, and recording or displaying the integrated echoes. Briefly the integrator adds the plurality of echoes which arrive from an object located instantaneously near the center of the radar beam with the proper phase to give a large resultant amplitude signal. For other positions of the object, that is, in approaching or leaving the center of the radar beam, successive echoes from the object arrive with sufficiently different phase, such that an effective cancellation of echoes occurs as a result of the integration process. The resultant integrated echoes provide an angular resolution comparable to that received from a radar antenna having an effective aperture width equal to the distance traveled by the aircraft relative to the object during the integration period. Thus the invention is capable of providing a substantial improvement in angular resolution over existing systems.

The features of the present invention which are believed to be novel are set forth with particularity in the appended claims. The present invention itself, both as to its organization and manner of operation, together with further objects and advantages thereof, may best be understood by reference to the following description taken in connection with the accompanying drawings in which FIG. 1 is a schematic representation of the improvement in angular resolution obtainable by use of our invention;

FIG. 2 is a diagrammatic representation useful in explaining the physical principles involved in the invention;

FIG. 3 is a set of wave forms useful in explaining further principles involved in the invention;

FIG. 4 is a block-diagram of a radar mapping system involving the invention;

FIG. 5 is a group of waveforms useful in explaining the operation of the arrangement of FIG. 4;

FIG. 6 is a block-diagram of another embodiment of my invention relating to a radar mapping system; and FIG. 7 is a group of wave forms useful in explaining the operation of the arrangement of FIG. 6.

FIG. 8a illustrates graphically the relationship of an antenna beam directivity angle $\theta$ and the velocity V of an aircraft.

FIG. 8b illustrates a modification of the arrangement of FIG. 6 to accommodate a different antenna beam directivity.

FIG. 9 illustrates an arrangement for separately storing and integrating received signals.

To facilitate the description of certain preferred embodiments of the invention to be given shortly, it may be desirable first to consider, with some detail, the fundamental nature and form of the physical properties that are involved. Referring to FIG. 1, there is shown a portion of a strip map, indicating echoes A and B received by the airborne mapping radar system from two adjacent ground objects. By directly recording the echoes received from ground objects scanned by the radar beam in the direction shown by the arrow 1, the indications A and B are undesirably elongated such that they merge in manner to make resolution of the detected objects difficult. By processing the received echoes in accordance with the invention before recording them on the strip map, improved resolution is obtainable for the same echoes as indicated at A' and B'. The present invention is able to provide this substantial increase in the angular resolution of objects detected within a beam width of a radar object detection antenna by making use of the Doppler frequency modulation resulting from any relative radial motion between the detected objects and the radar antenna. In FIG. 2 if a plane is moving in the direction of the arrow 2 with a velocity V, the range and the radial direction D to, say a stationary ground object will vary with time. This change in range occurring for say the two successive aircraft positions 3 and 4, is indicated in FIG. 2 by the length of path C. The relative velocities of the object and aircraft, and the consequent time rate of change of the angle between the direction of travel of the aircraft and the radial direction of the object from the aircraft results in a radial velocity between aircraft and object. Now, if radio frequency waves are radiated by a sidewise pointing antenna 5 carried aboard the aircraft, reflected from the ground object, and the reflections, or echoes, received back at the aircraft, the phase of the received radio waves will vary as the path length to the target varies due to this radial velocity. The resultant, continuous phase variation when referred to the phase of the waves originally transmitted, results in a difference frequency which is often called the Doppler frequency. Simple calculations show that in our illustration, radio waves, having a frequency in the X band, undergo a Doppler shift of the order of 29 cycles per second per mile per hour of radial velocity.

In order to derive the Doppler frequency, the phase variation of the received waves must be referred to the phase of the transmitted waves. To facilitate the phase comparison, a common practice is to provide a highly stable source of oscillations at the radar position to which the transmitted waves as well as the received echo waves are referred for comparison purposes. If in a preferred embodiment to be described shortly, the transmitted waves are derived directly from the reference oscillations by a system of frequency multiplication and power amplification, it then becomes necessary merely to compare the received echo waves with the reference oscillations. This phase change information, or Doppler frequency beat, as previously described, is indicative of the rate of change in range between the aircraft and object.

Referring to FIG. 3 there is shown, graphically, the form of Doppler frequency beat obtainable between the transmitted waves and the received echoes as the radar beam generated from an aircraft sweeps objects located at different ranges. In the graph, time of sweeping of the radar beam in space is plotted as the ordinate and the Doppler beat frequency voltage is plotted as abscissa.

At the instant O, the object is located in the center of the beam, and it should be noted that in the case of the solid curve, it has been assumed that the object is at such a range as to have the echo waves received at the aircraft in phase with the reference frequency oscillations. Since it has been assumed in the graph that the beam is sweeping across the object from left to right, it should be noted that the Doppler beat frequency first decreases rapidly as the radar beam approaches the object, passes through zero beat when the object is located in the center of the beam, and then increases rapidly again as the beam recedes from the object. It can be seen that the center half cycle, between two ordinate axes crossings, is considerably wider than the next whole cycle, and subsequent cycles rapidly become still narrower. In accordance with the invention, it is the low frequency cycles near zero beat which are emphasized by integration and displayed. The dotted curve of FIG. 3 indicates the situation when the object is at such a range as to have the echo waves received at the aircraft out of phase with the reference frequency oscillations. Here again, as for all other ranges, a distinctive, zero beat half cycle is obtained as the antenna beam sweeps past the object being detected.

Referring to FIG. 4 there is shown in block diagram form an airborne radar system for making use of the Doppler beat frequency information in order to obtain an appreciable increase in angular resolution of received radar echoes. In this particular embodiment, the radar pulses are transmitted periodically in a narrow beam directed at right angles to the direction of aircraft flight. Any Doppler beat frequency available from beating the received echoes with oscillations from a reference oscillator associated with the radar pulse transmissions are converted to a bipolar video signal which is stored, integrated, and then rectified to yield enhanced angular information of the detected objects.

In the airborne radar object-location and indicator system of FIG. 4, a highly stable master oscillator 6 serves as the source of reference oscillations to obtain phase coherence between the transmitted waves and the received echo waves. These reference oscillations are multiplied upward to the desired radar operating frequency, say $f$, in circuit 7 and then amplified to the high powers needed for radar object detection in circuit 8. Keyer 9 serves to modulate power amplifier 8, which may be a klystron amplifier, to yield periodic pulses of radar frequency waves. These pulses are transmitted by antenna 10 in a narrow beam directed at right angles to the direction of aircraft flight and towards the objects to be detected. The beam may be of the order of 1° wide at its half power points. Thus as the aircraft moves along in space, the narrow beam directed at the ground, if ground objects are being located, sweeps the area to one side of the aircraft. An echo returned from an object intercepted by the sweeping radar beam is received by antenna 10 at a time after the related pulse transmission in accordance with its range from the antenna. The received echoes are applied to TR box 11, which operates in a well known manner to block the high power pulse transmissions from entering the mixer circuit 12 in the receiver while permitting weaker echoes to be passed therethrough for amplification and processing. In accordance with usual practice, the echo waves at frequency $f$ are mixed in mixer 12 with local oscillations of frequency $f+\Delta$ available over lead 13 from source 14 to yield echo waves at an intermediate frequency $\Delta$ at the output of the mixer circuit. In order that the Doppler beat frequency may be derived for processing into the desired angular resolution information, it becomes necessary that the local oscillator frequency be referenced with respect to the transmitted radar frequency $f$. This is accomplished in the present instance by employing circuit 14 to multiply the frequency of the master frequency oscillations available over lead 15 to the desired local oscillator frequency $f+\Delta$. The coherent, intermediate frequency waves of frequency $\Delta$ available from mixer 12 are amplified in 16 and then applied to the coherent detector 17. Also, the output oscillations available on lead 19 from multiplier 7, having a frequency and phase identical to that of the transmitted waves, are mixed in 18 with the local oscillations of frequency $f+\Delta$, available from multiplier 14, to yield waves at the intermediate frequency $\Delta$. It should be noted that the signals from mixer 18 carry the phase of the transmitted waves, whereas the signals from amplifier 16 carry the phase of the corresponding received echo returned from an irradiated object. Coherent detector 17 serves to detect the relative phases of the waves available from sources 16 and 18 in a manner to provide at its output a Doppler beat frequency in the form of a bipolar video signal which is related to the position of the detected object within the radar beam. Coherent detector 17 may be of the form shown in Radiation Laboratory Series, vol. 1, page 667, Radar System Engineering, L.N. Ridenour, McGraw-Hill Publishing Co., 1947.

Referring to FIG. 5a, there is shown the bipolar video echo pulse pattern developed by detector 17. Each of the vertical lines corresponds to a received echo pulse in video form. It should be noted that the bipolar video has a frequency modulation corresponding to the Doppler beat frequency mentioned in explaining FIG. 3 and in addition an amplitude modulation due to the antenna beam directivity. As previously explained with respect to FIG. 3, the particular form of bipolar video illustrated in FIG. 5a corresponds to the situation where the object is at a range such that the returned echo is of the same phase as the transmitted wave. In studying the change in beat frequency as the antenna beam sweeps through the object it is noted that the center half cycle 20 is substantially narrower than the actual beam width of the antenna.

In accordance with the invention, by storing and integrating the bipolar video, the plurality of echoes returned from any given target intercepted by the radar beam are processed to yield the substantially narrower pattern of echo signals shown in FIG. 5b. It should be noted that an effective narrowing in beamwidth has been achieved.

Returning to FIG. 4, the bipolar video echoes are integrated to yield the desired output signal of FIG. 5b by recycling through a delay line 21 having a delay equal to a single repetition period in the following manner. The echoes available at the output of detector 17 are added in circuit 22 to the echoes received previously from the same object, which echoes have been delayed in the delay line 21 and made available over lead 23. After addition and amplification in 22, the resultant composite video echoes are impressed by amplitude modulator 24 on to a carrier wave available from source 25. The frequency of the carrier wave is selected in accordance with the type of delay line employed, since the delay line will have an electrical length dependent upon the frequency of the carrier waves as well as the pulse repetition period of the radar transmitter established by keyer 9. If there is no objection from the standpoint of frequency, the output waves of frequency Δ available from mixer 18 may be used in place of the waves from source 25 as shown by closing switch 26 to its other position.

The bipolar video echoes superimposed on the carrier waves are delayed one full radar pulse repetition period in 21, amplified in 27 and amplitude detected in 28 to yield delayed bipolar video echoes. These delayed echoes are amplified in 29 and returned over lead 23 to be added to the newly arriving echoes from detector 17. The result of these successive delays in 21 and additions in 22 is to provide an integrated signal corresponding to that shown in FIG. 5b. This signal is rectified in full wave rectifier 30 and applied to the utilization device 31. Device 31 may comprise an indicator for displaying the enhanced angular position of the objects detected by the radar, or may comprise an arrangement for continuously recording the enhanced signals available from rectifier as shown by the strip map in FIG. 1. In a strip map, as the term is generally used, range is displayed across the width of a photographic or facsimile recording paper, and the paper, generally in the form of a roll, moves lengthwise to display sequentially the cross section of detected objects that the radar beam scans as the plane moves through space.

While the embodiment of FIG. 4 provides for integration of the received echoes in bipolar video form, in certain instances it may be desirable to perform the integration on the echo signals while still in carrier frequency form. FIG. 6 illustrates an arrangement for obtaining enhanced angular resolution of received echoes by performing the integration on the echoes while in intermediate frequency form. For purposes of simplicity, only the modifications of the arrangement of FIG. 4 necessary to provide integration of the echoes at the intermediate frequency level are shown in FIG. 6, the remainder of the radar system being assumed identical to that of FIG. 4. The reference numerals of FIG. 4 have been retained wherever identical components are involved.

The incoming echoes from the TR box, at the radio frequency $f$, are mixed in mixer 12 with the local oscillations $f+\Delta$, derived from oscillator 6 by frequency multiplication in 14, to yield the amplitude-modulated pulse pattern of FIG. 7a. Each of the vertical lines in the wave pattern corresponds to a received echo pulse containing a plurality of oscillations at the intermediate frequency. The amplitude modulation of the overall pulse pattern is introduced by the directional properties of the radar antenna 10.

The resultant echoes at the intermediate frequency Δ are integrated by recycling through a delay line 32 introducing a time delay at the intermediate operating frequency equal to a single repetition period of the transmitted radar pulses. In order that the integration be effective, it is also necessary that the delay time be substantially equal to an integral number of intermediate frequency cycles. This places a stringent requirement on the stability of the master oscillator 6 and if necessary a suitable automatic frequency control system may be employed with oscillator 6.

The echoes at the intermediate frequency arriving from mixer 12 are added in 33 to the echoes available over lead 34, which were received previously from the same object and delayed in delay line 32. After addition in 33 and amplification in 35, the resultant echoes at the intermediate frequency level are applied to delay line 32 where they are delayed one full radar pulse repetition period. The delayed pulses are amplified in 36 and returned over lead 34 to be added to the newly arriving echoes from mixer 12. The result of these successive delays in 32 and additions in 33 is to provide an integrated intermediate frequency signal at the input to the amplifier 37 similar to that shown in FIG. 7b. Here again, it should be noted that there has occurred an effective narrowing of the actual radar beam width with a consequent improvement in angular resolution of the detected object position.

The integrated echoes of the form shown in FIG. 7b are amplified to a suitable level in amplifier 37, FIG. 6 before being amplitude detected by 38 and applied to a utilization device 39. As previously mentioned, device 39 may comprise an indicator, or suitable recording instrument.

While the invention has been described in terms of a radar beam directed at right angles to the direction of aircraft flight, it may be necessary in certain instances to have the beam directed at some other angle $\theta$ as shown in FIG. 8a. In this case a Doppler frequency shift $f_0$ is introduced which is equal to $$\frac{2V}{\lambda} \cos \theta$$

where V is the aircraft velocity and λ is the radar operating wavelength. FIG. 8b indicates the manner in which the Doppler freqeuncy shift $f_0$ may be compensated for in the system of FIG. 6 to give the desired enhanced angular information. The connection 13 between the frequency multiplier circuit 14 of FIG. 6 and the mixer circuit 12 is broken at the point X and the circuit arragnement of FIG. 8b introduced. The output oscillations from 14, a frequency $f+\Delta$, are modulated by the oscillations of frequency $f_0$ from oscillator 40 in the balanced modulator 41. The modulated output of 41 is then applied to the single sideband filter 42 to yield only the single sideband output at a frequency $f+\Delta+f_0$. This sideband output when applied to mixer 12 and processed in the manner previously described, compensates for the undesirable Doppler frequency shift $f_0$ due to the offset radar beam position $\theta$, of FIG. 8a, and permits the obtaining of the enhanced angular information desired.

In a similar manner, the circuit arrangement of FIG. 4 may be modified to accommodate a different radar beam directivity. Referring to FIG. 4, the circuit between 18 and 17 may be broken at X, and a circuit arrangement similar to 8b inserted so that upon modulation of the oscillations of frequency Δ by the oscillation of frequency $f_0$, the desired sideband output at frequency $\Delta+f_0$ may be obtained for application to detector 17.

It should be noted that since the Doppler frequency $f_0$ is being pulse sampled at the radar pulse repetition rate, the output frequency of the compensating oscillator, 40 of FIG. 8b, could be made equal to $f_0 \pm nf_r$. That is, any integral multiple of the pulse repetition rate could be added to or subtracted from $f_0$ to give the desired compensating frequency signal to effect, in principle, the same result.

Under certain conditions it may be desirable to vary the repetition rate, rather than introduce a separate signal $f_0$ as shown in FIG. 8b. The repetition rate would be selected for the particular angle $\theta$, FIG. 8a, for which the repetition rate is a submultiple of $f_0$. This is shown symbolically in FIG. 4, by the arrow 42 associated with keyer 9. Since any adjustment of the repetition rate of keyer 9 must also include an adjustment of the time delay introduced by delay line 21, an arrow 43 indicating an adjustable control is provided for delay line 21. Under certain conditions it may be desirable to effect adjustment of keyer 9 and delay line 21 simultaneously, and accordingly this may be accomplished by a mechanical linkage 44.

Although we have shown a reentrant delay line as the cumulative storage and integration element for the carrier frequency and bipolar video radar echoes, other devices may be used. For example, in FIG. 9 the functions of storage and integration are performed by separate devices. In operation, the arrangement of FIGURE 9 would replace the circuits being fed from detector 17 and comprising elements 22 through 31. In a particular embodiment employing a well-known form of magnetic storage drum, the bipolar signals carrying the relative phase information are recorded or stored magnetically by a writing head on a disc rotating at high speed. The stored signals are then integrated by being read out simultaneously by a number of reading heads and added together. The resultant integrated output, is then rectified as shown and applied to an indicator or displayed on a strip map as previously described.

The invention, while described in terms of a radar type object location system employing electromagnetic waves, is readily applicable to systems using other forms of energy such as sonar. Furthermore in certain application the energy may be transmitted continuously, rather than being pulsed as has been described.

While we have shown a particular embodiment of our invention, it will of course be understood that we do not wish to be limited thereto since many modifications, both in the circuit arrangement and in the instrumentalities employed, may be made, and we therefore contemplate by the appended claims to cover any such modifications as fall within the true spirit and scope of our invention.

What we claim is new and desired to secure by Letters Patent of the United States is:

1. An object detection system comprising means for transmitting pulses of energy waves toward a remote object at a given recurrence rate and in a directive beam emanating from a predetermined phase center, means for effectively moving said phase center relative to said object and with a component of velocity which is at right angles to the direction of directivity of said beam, means for receiving said transmitted pulses after reradiation from said object, means for deriving bipolar signals indicative of the relative phases of said transmitted and received waves as said beam moves through said object, and means for integrating said bipolar signals.

2. A detection system for objects comprising a source of first oscillations, means responsive to said oscillations for transmitting recurrent electromagnetic waves in a directive beam, means for moving said directive beam through space with a component of velocity normal to the line joining the objects and the phase center of said beam, means for receiving said waves after reradiation from said objects irradiated by said beam, means for frequency multiplying said first oscillations to derive local oscillations, means for mixing said received waves and said local oscillations to derive intermediate frequency oscillations, and means for integrating said intermediate frequency oscillations corresponding to the waves reradiated from the same objects while retaining phase coherence over successive recurrence periods to obtain respective output signals.

3. A system for mapping the location of objects, said system located on a platform moving with respect to said objects, said system comprising movable means for transmitting recurrent electromagnetic waves in a directive beam fixedly directed at right angles to the direction of motion of said platform, said movable means adapted to receive said waves after reflection from an object irradiated by said beam, means for deriving bipolar signals indicative of the relative phases of said transmitted and received waves as said beam scans through said object as a result of the motion of said movable means, means for integrating the bipolar signals corresponding to the waves received from said irradiated object while retaining phase coherence over successive recurrence periods, means for full wave rectifying said integrated signals to derive output signals, and means responsive to said output signals for providing said location map of said objects.

4. An object detection system comprising means for transmitting recurrent electromagnetic waves in a directive beam, means for moving said beam through space, means for receiving said waves after reflection from objects at different ranges irradiated by said moving beam, means for deriving bipolar signals indicative of the relative phases of said transmitted and received waves during the period when said beam moves through said objects, and means for obtaining individual signals accurately indicative of the range of each of said objects comprising means for respectively integrating the bipolar signals corresponding to waves received from each of the same objects while retaining phase coherence of said waves over successive transmitted wave recurrence periods to provide respective integrated bipolar signals for each of said objects.

5. An object detection system comprising means for recurrently transmitting pulses of electromagnetic waves of a predetermined phase in a directive beam to remote objects at different ranges to be detected, means for receiving said transmitted waves after reflection from said objects, said received waves having respective phases dependent upon the relative positions of said first named means and said objects, means responsive to the phases of said transmitted waves and the corresponding waves received after reflection from said objects to provide signals indicative of their relative phases, and means for respectively integrating said last-named signals corresponding to waves received from each of the same objects while maintaining phase coherence of said waves over successive pulse recurrence periods to provide respective integrated signals for each of said objects.

6. A radar object detection system comprising a source of first oscillations, means responsive to said oscillations for transmitting electromagnetic waves in a directive beam adapted to be moved through space, means adapted to receive said waves after reflection from objects at different ranges irradiated by said moving beam, means responsive to said oscillations to derive second oscillations having a frequency different therefrom, means for mixing said received waves and said second oscillations to derive third oscillations, means for storing said third oscillations and means for respectively integrating said third oscillations corresponding to waves received from each of the same objects while maintaining phase coherence of said waves to provide respective integrated third oscillations for each of said objects.

7. A radar object detection system comprising a source of first oscillations, means for changing the frequency of said oscillations to derive second oscillations, an antenna means for recurrently transmitting periodic pulses of said second oscillations in a directive beam, means for moving said antenna to impart a component of velocity to said beam which is at an angle divergent from the direction of directivity of said beam, said antenna adapted to receive said pulses after reflection from an object irradiated by said beam, means for changing the frequency of said first oscillations to derive third oscillations, means for mixing said received pulses and said third oscillations to derive pulses of fourth oscillations, means for mixing said third oscillations and said second oscillations to derive fifth oscillations, means for coherently detecting the relative phases of said fourth oscillation pulses and said fifth oscillations to derive bipolar video pulses, means for selectively integrating the bipolar video pulses corresponding to the waves received from said irradiated object as said beam scans through said object comprising a reentrant electrical delay line responsive to applied signals for time delaying such applied signals by an amount equal to an integral multiple of the recurrence rate of said transmitted pulses and means for applying said derived bipolar video pulses to said delay line for producing integrated bipolar video pulses, and means for utilizing said integrated bipolar video pulses.

8. A radar object detection system comprising a source of first oscillations, means for changing the frequency of said oscillations to derive second oscillations, an antenna means for recurrently transmitting pulses of said second oscillations at a given recurrence rate in a directive beam, means for moving said antenna to impart a component of velocity to said beam at right angles to the direction of directivity of said beam, said antenna adapted to receive said transmitted pulses after reflection from an object irradiated by said scanning beam, means for changing the frequency of said first oscillations to derive third oscillations, means for mixing said received pulses and said third oscillations to derive pulses of fourth oscillations, means for mixing said third oscillations and said second oscillations to derive fifth oscillations, means for coherently detecting the relative phases of said fourth oscillation pulses and said fifth oscillations to derive coherent bipolar video pulses, and means for integrating said video pulses at a rate equal to an integral multiple of said given recurrence rate.

9. An airborne radar object detection system comprising antenna means for transmitting pulses of electromagnetic waves at a given recurrence rate in a directive beam, means for translating said beam through space in a direction at right angles to the direction of directivity of said beam, said antenna means receiving said transmitted pulses after reflection from an object irradiated by said directive beam to provide received pulses, means responsive to the phases of said transmitted and received pulses for providing bipolar signals indicative of the relative phases thereof, and means operative at an integral multiple of the recurrence period of said transmitted pulses for integrating said bipolar signals.

10. An object detection system comprising movable means for transmitting pulses of electromagnetic waves in a directive beam fixedly directed in a direction having an angle divergent from the direction of motion of said means and for receiving said waves after reflection from an object irradiated by said beam, means for deriving bipolar signals indicative of the relative phases of said transmitted and received waves as said beam scans through said object as a result of the motion of said movable means, means for selectively integrating the bipolar signals corresponding to the waves received from said irradiated object comprising a reentrant electrical delay line having a delay equal to an integral multiple of the period between transmitted pulses, and means for utilizing the output of said delay line.

11. A radar object detection system comprising a source of oscillations, antenna means responsive to said oscillations for recurrently transmitting pulses of electromagnetic waves in a directive beam into space, said beam adapted to be moved with a component of velocity which is at right angles to the direction of directivity of said beam to scan an area in space, said antenna means adapted to receive said transmitted waves after reflection from objects irradiated by said scanning beam, means for detecting the relative phases of said received waves and the oscillations from said source to derive bipolar signals, means for storing said bipolar signals, and means for selectively integrating the stored bipolar signals corresponding to the reflected waves received from the same objects to provide respective output indications corresponding to each of said objects.

12. A radar object detection system comprising an antenna for recurrently transmitting pulses of electromagnetic waves in a directive beam, said beam adapted to be moved with a component of velocity which is at right angles to the direction of directivity of said beam, said antenna adapted to receive said transmitted pulses after reflection from objects irradiated by said beam, means responsive to the phases of said transmitted and corresponding received waves for providing bipolar waves indicative of the relative phase relationships therebetween and means for selectively integrating the bipolar waves corresponding to a plurality of transmitted pulses received from the same objects to obtain respective output signals corresponding to each of said objects.

13. A radar object detection system comprising a source of oscillations, an antenna responsive to said oscillations for recurrently transmitting pulses of electromagnetic waves in a directive beam into space, means for translating said beam with a component of velocity which is at right angles to the direction of directivity of said beam to cause said beam to scan an area in space, said antenna adapted to receive said waves after reflection from an object irradiated by said scanning beam, means for detecting the relative phases of said received waves and said oscillations to derive bipolar video signals, and means for integrating the derived signals corresponding to the reflected waves received from the same object comprising a reentrant electrical delay line dimensioned to provide a time delay equal to the period between succesive pulse transmissions.

14. A radar object detection system comprising a source of oscillations, means responsive to said oscillations for transmitting a directive beam of electro-magnetic waves into space, means for translating said beam with a component of velocity which is at an angle divergent from the direction of directivity of said beam to scan an area in space, means for receiving said transmitted waves after reflection from an object irradiated by said moving beam, means for modifying the frequency of said oscillations in accordance with the value of said angle, means for mixing said received waves and said modified oscillations to derive bipolar signals, means for integrating said bipolar signals comprising a re-entrant delay line responsive to applied signals to time delay said applied signals by an amount equal to an integral multiple of the period between said transmitted waves and means for applying said derived bipolar signals to said delay line for producing integrated bipolar signals, and means for utilizing said integrated bipolar signals.

15. A radar object detection system comprising antenna means for transmitting pulses of electromagnetic waves at a given recurrence rate in a directive beam, means for moving said beam in a direction having an angle which is divergent from the direction of directivity of said beam, said antenna means adapted to receive said pulses after reflection from an object irradiated by said scanning beam, means responsive to said transmitted and received waves for providing bipolar signals indicative of the relative phases thereof, means for modifying the frequency characteristic of said bipolar signals in accordance with the deviation of said angle of scan of said beam from a predetermined angle with respect to the beam directivity, means for integrating said modified bipolar signals at the pulse recurrence rate of said transmitted pulses, and means for utilizing said integrating bipolar signals.

16. A radar object detection system comprising antenna means for transmitting pulses of electromagnetic waves at a given recurrence rate in a directive beam, means for moving said beam in a direction having an angle which is divergent from the direction of directivity of said beam, said antenna means adapted to receive said pulses after reflection from an object irradiated by said scanning beam, means responsive to said transmitted and received waves for providing bipolar signals indicative of the relative phases thereof, means for modifying the frequency characteristic of said bipolar signals in accordance with the deviation of said angle of scan of said beam from a predetermined angle with respect to the beam directivity comprising means for changing said pulse recurrence rate, and means for integrating said modified bipolar signals at the pulse recurrence rate of said transmitted pulses comprising a reentrant electrical delay line dimensioned to provide a time delay equal to the time between successive pulse transmissions.

17. A radar object detection system comprising a source of oscillations, antenna means responsive to said oscillations for transmitting pulses of electromagnetic waves at a given recurrence rate in a direction beam, means for moving said beam in a direction having an angle which is divergent from the direction of directivity of said beam, said antenna means adapted to receive said pulses after reflection from an object irradiated by said scanning beam, means responsive to said oscillations and said received waves for providing bipolar signals indicative of the relative phases thereof, means for modifying the frequency characteristic of said bipolar signals in accordance with the deviation of said angle of scan of said beam from a predeterminal angle with respect to the beam directivity comprising means for changing the frequency of said oscillations, means for integrating said modified bipolar signals at the pulse recurrence rate of said transmitted pulses, and means for utilizing said integrated bipolar signals.

18. A radar object detection system comprising a source of oscillations, antenna means responsive to said oscillations for transmitting pulses of electromagnetic waves at a given recurrence rate in a directive beam, means for translating said beam in a direction having a fixed angle which is divergent from the direction of directivity of said beam, said antenna means adapted to receive said transmitted pulses after reflection from objects irradiated by said beam, means responsive to said oscillations and said received waves for providing bipolar signals indicative of the relative phases thereof, means for modifying the frequency characteristic of said bipolar signals in accordance with the deviation of said angle of scan of said beam from an orthogonal relation with respect to the beam directivity comprising means for changing the frequency of said oscillations and means for integrating the modified bipolar signals corresponding to the waves received from the same object to obtain respective output signals corresponding to each of said objects.

19. An object detection system comprising antenna means for transmitting pulses of electromagnetic waves towards a remote object at a given recurrence rate and in a directive beam, means for translating said beam through space with a component of velocity which is at right angles to the direction of directivity of said beam, said antenna means receiving said transmitted pulses after reradiation from an object irradiated by said translating beam, means responsive to the phases of said transmitted and received waves for providing bipolar signals indicative of the relative phases thereof, and means for integrating said bipolar signals comprising means for separately storing said bipolar signals, and means for adding a plurality of said separately stored signals.

20. An arrangement comprising means for transmitting energy waves, means for receiving energy waves, means responsive to said transmitted and received waves for providing bipolar signals indicative of the relative phases thereof, and means for integrating said bipolar signals comprising means for separately storing said bipolar signals, and means for adding a plurality of said separately stored signals.

21. An arrangement comprising means for transmitting energy waves, means for receiving energy waves, means responsive to said received waves and the phase of said transmitted waves for providing bipolar signals having an instantaneous amplitude which varies as a function of the amplitude of said received waves and the phase angle of said received waves with respect to said transmitted waves, and means for integrating said bipolar signals comprising means for separately storing said bipolar signals and means for adding a plurality of said separately stored signals.

22. An object detection system comprising means for transmitting pulses of energy waves at a given recurrence rate in a directive beam, means for translating said beam through space with a component of velocity which is at right angles to the direction of directivity of said beam, means for receiving said transmitted pulses after reradiation from an object irradiated by said translating beam, means responsive to the phases of said transmitted and received waves for providing bipolar signals indicative of the relative phases thereof, and means for adding bipolar signals corresponding to transmitted pulses received from objects at the same range.

23. An object detection system comprising means for transmitting energy waves in a directive beam, means for providing relative translation of said beam with respect to said object and with a component of velocity at right angles to the direction of directivity of said beam, means for receiving the transmitted waves after reradiation from said object upon irradiation by said beam, means responsive to said received waves and the phase of said transmitted waves for providing bipolar signals having an instantaneous amplitude which varies as a function of the amplitude of said received waves and the phase angle of said received waves with respect to said transmitted waves and means for adding said bipolar signals corresponding to transmitted pulses received from objects at the same range.

24. An object detection system comprising means for recurrently transmitting pulses of energy waves toward a remote object in a directive beam emanating from a predetermined phase center, means for moving said beam phase center relative to said object with a component of velocity which is at right agles to the direction of directivity of said beam, means for receiving said transmitted pulses after reradiation from said object, means for deriving bipolar signals indicative of the relative phase of said transmitted and received waves as said beam moves through said object, and means for adding the bipolar signals corresponding to transmitted pulses received from objects at the same range, and means for displaying said added signals.

References Cited in the file of this patent

UNITED STATES PATENTS

| | | |
|---|---|---|
| 2,422,135 | Sanders | June 10, 1947 |
| 2,487,995 | Tucker | Nov. 15, 1949 |
| 2,517,549 | Earp | Aug. 8, 1950 |
| 2,543,449 | Emslie | Feb. 27, 1951 |
| 2,650,357 | Munster | Aug. 25, 1953 |
| 2,663,518 | Muffly | Dec. 22, 1953 |
| 2,669,710 | Sherr | Feb. 16, 1954 |

UNITED STATES PATENT OFFICE
CERTIFICATE OF CORRECTION

Patent No. 3,121,868            February 18, 1964

Walter Hausz et al.

It is hereby certified that error appears in the above numbered patent requiring correction and that the said Letters Patent should read as corrected below.

Column 11, line 4, for "direction" read -- directive --; line 14, for "predeterminal" read -- predetermined --; column 12, line 3, strike out "energy waves, means for receiving energy waves, means" and insert the same before "responsive" in line 1, same column 12.

Signed and sealed this 4th day of August 1964.

(SEAL)
Attest:

ERNEST W. SWIDER
Attesting Officer

EDWARD J. BRENNER
Commissioner of Patents